US012438410B2

(12) United States Patent
Jang et al.

(10) Patent No.: US 12,438,410 B2
(45) Date of Patent: Oct. 7, 2025

(54) STATOR HAVING COIL HOOK ON TEETH END

(71) Applicant: NEW MOTECH CO., LTD., Gwangju (KR)

(72) Inventors: Jeong Cheol Jang, Gwangju (KR); Min Ho Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 195 days.

(21) Appl. No.: 18/038,246

(22) PCT Filed: Nov. 11, 2021

(86) PCT No.: PCT/KR2021/016454
§ 371 (c)(1),
(2) Date: May 23, 2023

(87) PCT Pub. No.: WO2022/149705
PCT Pub. Date: Jul. 14, 2022

(65) Prior Publication Data
US 2024/0097519 A1 Mar. 21, 2024

(30) Foreign Application Priority Data
Jan. 11, 2021 (KR) .......................... 10-2021-0003244

(51) Int. Cl.
*H02K 3/50* (2006.01)
*H02K 3/34* (2006.01)
*H02K 3/52* (2006.01)

(52) U.S. Cl.
CPC ............... *H02K 3/50* (2013.01); *H02K 3/345* (2013.01); *H02K 3/52* (2013.01); *H02K 3/522* (2013.01)

(58) Field of Classification Search
CPC ... H02K 3/522; H02K 3/50; H02K 3/34; H02K 3/345; H02K 3/38; H02K 3/52; H02K 3/32; Y02T 10/64
(Continued)

(56) References Cited

U.S. PATENT DOCUMENTS

| 6,967,421 B2 | 11/2005 | Gomyo et al. |
| 2016/0204668 A1 | 7/2016 | Shahamat et al. |
| 2017/0302119 A1* | 10/2017 | Jang ....................... H02K 3/522 |

FOREIGN PATENT DOCUMENTS

| JP | 2011-120413 A | 6/2011 |
| JP | 2012-244798 A | 12/2012 |

(Continued)

OTHER PUBLICATIONS

Yamazaki et al, Outer Rotor Motor, Jan. 7, 2013, JP 2013005634 (English Machine Translation) (Year: 2013).*
(Continued)

*Primary Examiner* — Alexander A Singh
(74) *Attorney, Agent, or Firm* — Revolution IP, PLLC

(57) ABSTRACT

The stator according to the present invention is characterized by comprising a stator core 11 including a base 111 of a circular shape, a teeth part 112 formed radially from the base 111, and a teeth end 113 extending to both sides in the circumferential direction at an end of the teeth part 112; an upper insulator 12 coupled to an upper part of the stator core 11, including an upper base insulating part 121 for insulating an upper part of the base 111, an upper teeth insulating part 122 formed radially in the outer circumferential direction of the upper base insulating part 121, for insulating the upper part of the teeth part 121, and an upper teeth end insulating part 123 located over the teeth end 113, protruding upward at an end of the upper teeth insulating part 122; a lower insulator 13 coupled to a lower part of the stator core 11, including a lower base insulating part 131 for insulating the (Continued)

lower part of the base 111, a lower teeth insulating part 132 formed radially in the outer circumferential direction of the lower base insulating part 131, for insulating a lower part of the teeth part 112, and a lower teeth end insulating part 133 located under the teeth end 113, protruding downward at an end of the lower teeth insulating part 132; and a coil 14 wound around the teeth part 112, wherein in an upper part of the upper teeth end insulating part 123, a coil hook 123A on which the coil 14 is hooked is formed to protrude upward.

4 Claims, 4 Drawing Sheets

(58) Field of Classification Search
USPC .................................................. 310/214, 215
See application file for complete search history.

(56) References Cited

FOREIGN PATENT DOCUMENTS

| JP | 2013005634 A | * | 1/2013 |
| JP | 2019-022380 A | | 2/2019 |

OTHER PUBLICATIONS

International Search Report for PCT/KR2021/016454 mailed Feb. 18, 2022 from Korean Intellectual Property Office.

* cited by examiner

[Fig. 1]
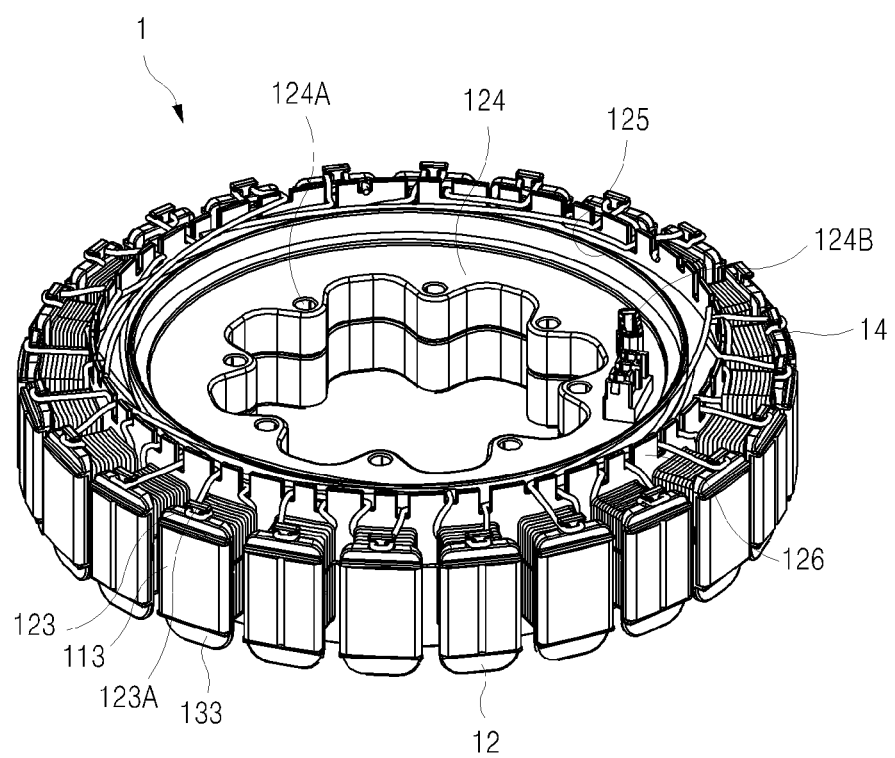

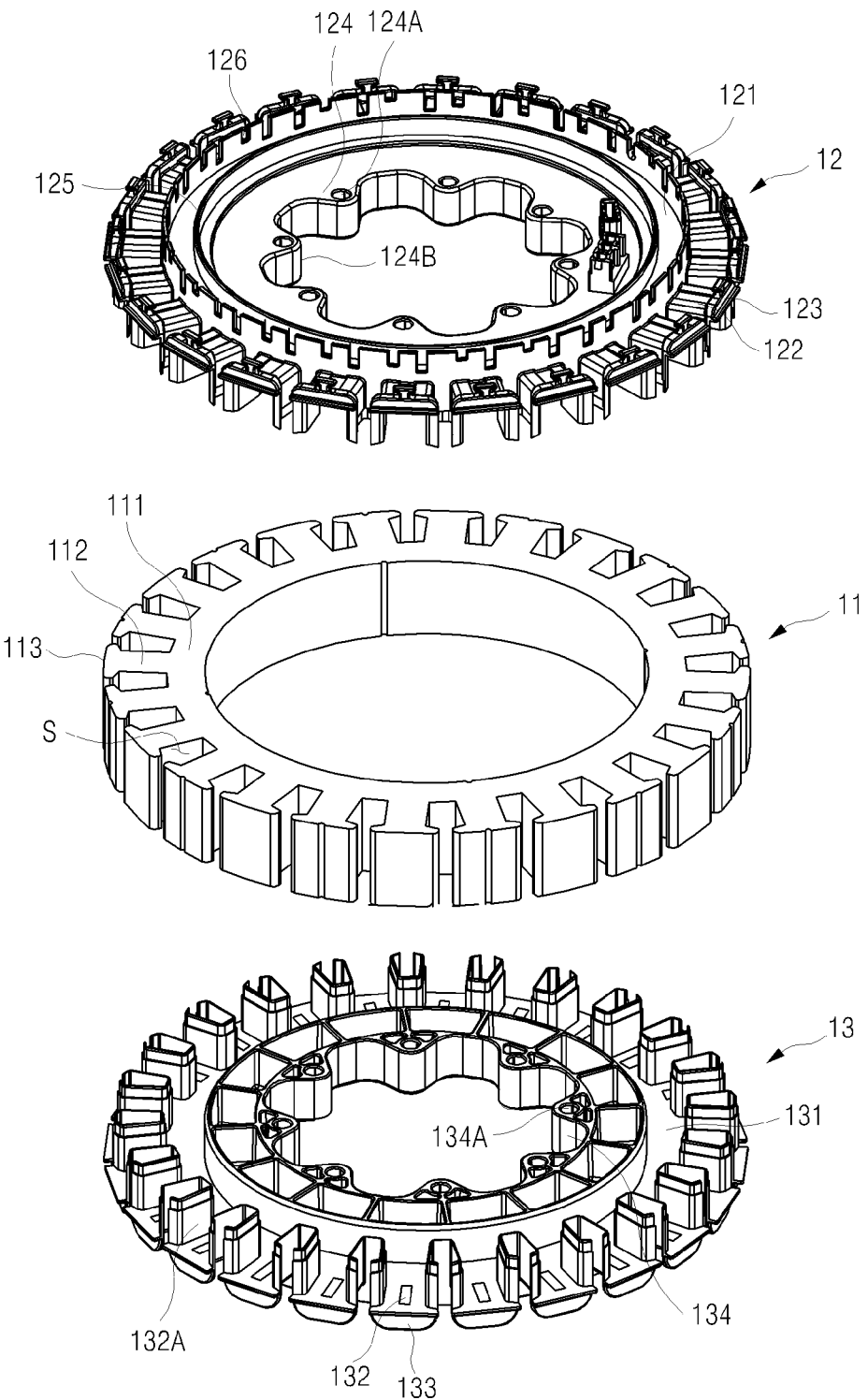
[Fig. 2]

[Fig. 3]
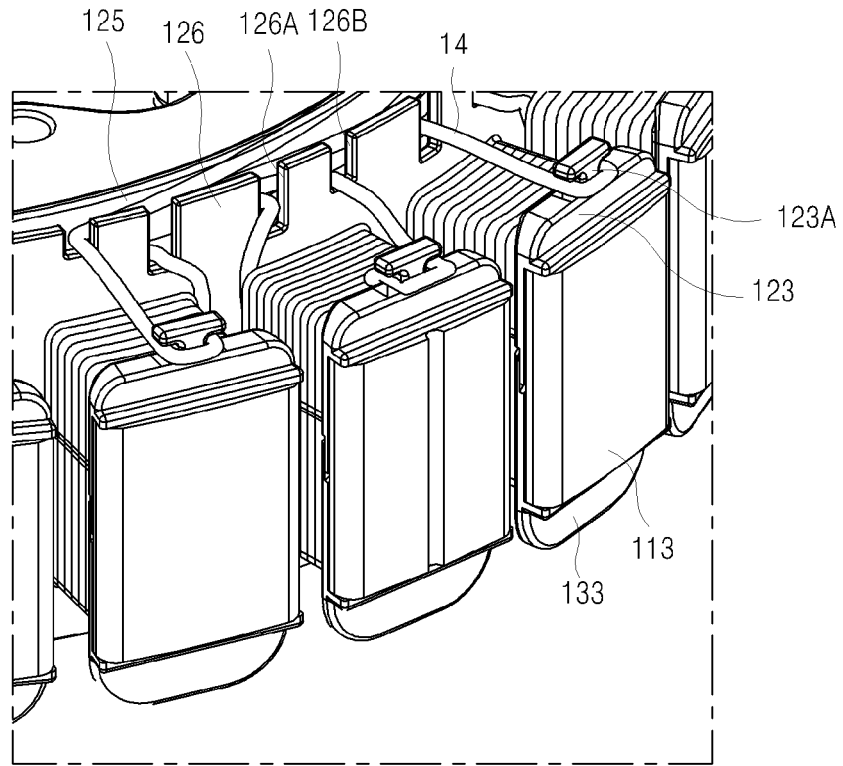
[Fig. 4]
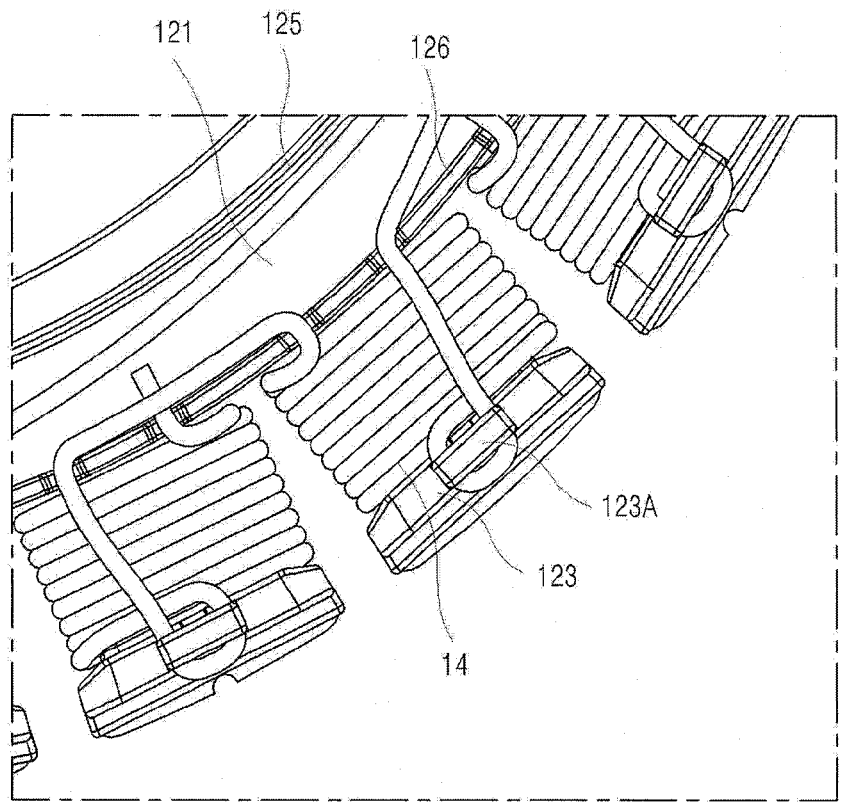

[Fig. 5]
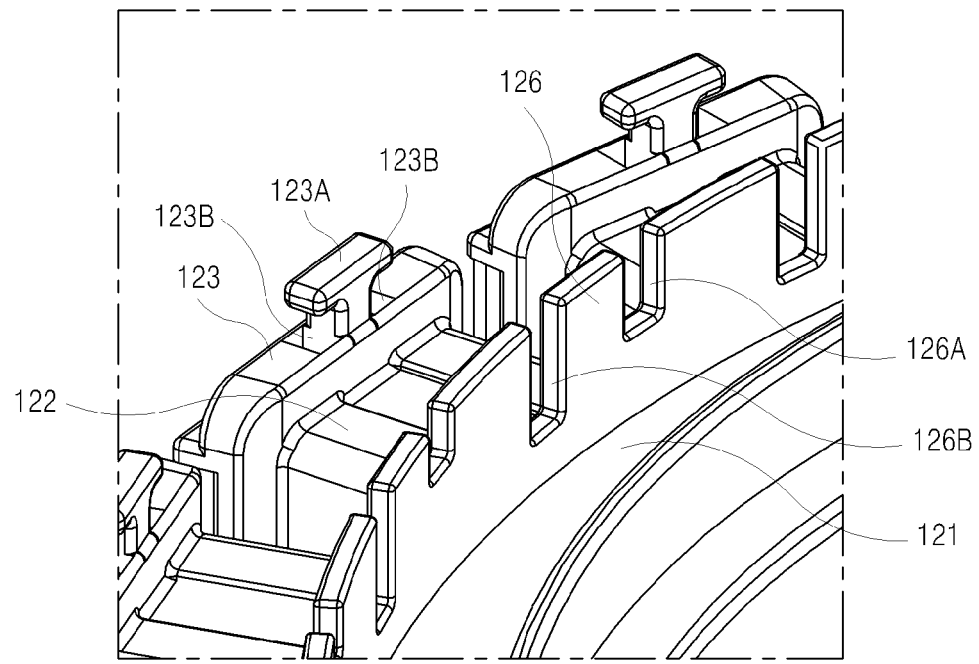
[Fig. 6]
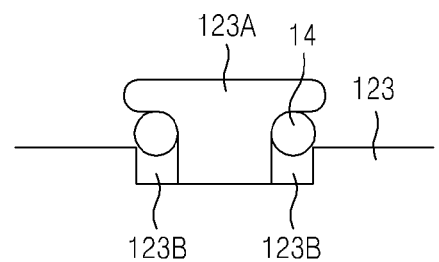
(a)
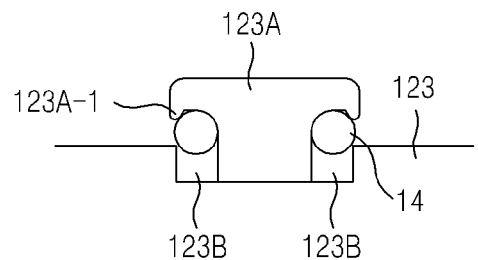
(b)

STATOR HAVING COIL HOOK ON TEETH END

TECHNICAL FIELD

The present invention relates to a stator of a motor. More specifically, the present invention relates to a stator of a motor which comprises a coil hook allowing a coil wound around the stator of the motor to be effectively guided at a teeth end.

BACKGROUND ART

In general, a motor includes a stator and a rotor. The stator includes a stator core. When power is applied to a coil wound around the stator core, the rotor rotates by a magnetic field generated around the stator core, and the load connected to a rotating shaft of the rotor rotates together with the rotor.

When a coil is wound around the stator core, the coil is wound around teeth which are formed radially in the stator core. After insulating the surface of the teeth with an insulating resin, the coil is wound therearound. The coil wound around the teeth is placed in a slot which is a space between each tooth. The coil is wound around the teeth according to the predetermined winding number.

In an outer rotor-type motor in which teeth are formed radially outward from a stator core, there is a case where coil winding starts from the inner diameter of the teeth and the number of turns for a tooth ends at the outer diameter. In this case, the coil which finishes the winding for a tooth at the outer diameter moves towards the inner diameter again and then moves towards another tooth again to continue the winding. Likewise, in the case of an inner rotor-type motor, coil winding starts from the outer diameter of the teeth and the number of turns ends at the inner diameter, and then the coil needs to move towards the outer diameter again.

When the coil winding is made as above, the coil needs to be arranged to move to another tooth, which is called shaping operation. For the shaping operation, the coil is complexly tangled up, which makes the operation more difficult and takes more time.

In order to solve the above-mentioned problems, U.S. Pat. No. 6,967,421 discloses a structure of providing a protruding section or a groove section at both ends of a tooth, on which the coil is hooked. However, according to this structure, the coil may not be firmly fixed to the protruding section or the groove section, and thus the coil may be displaced during the winding or shaping operation, which leads to the defect.

Accordingly, in order to solve the above-mentioned problems, the present inventors suggest a stator of a novel structure.

DISCLOSURE OF INVENTION

Technical Problem

It is an object of the present invention to provide a stator in which a coil is effectively guided at a tooth end.

It is another object of the present invention to provide a stator facilitating coil winding, thereby having excellent workability.

It is yet another object of the present invention to provide a stator in which the coil is effectively guided at the tooth end and is firmly wound therearound at the same time.

It is yet another object of the present invention to provide a stator capable of preventing the defect that occurs by coil winding.

The above and other inherent objects of the present invention may all be easily achieved by the description of the present invention described below.

Solution to Problem

The stator according to the present invention is characterized by comprising a stator core 11 including a base 111 of a circular shape, a teeth part 112 formed radially from the base 111, and a teeth end 113 extending to both sides in the circumferential direction at an end of the teeth part 112; an upper insulator 12 coupled to an upper part of the stator core 11, including an upper base insulating part 121 for insulating an upper part of the base 111, an upper teeth insulating part 122 formed radially in the outer circumferential direction of the upper base insulating part 121, for insulating an upper part of the teeth part 121, and an upper teeth end insulating part 123 located over the teeth end 113, protruding upward at an end of the upper teeth insulating part 122; a lower insulator 13 coupled to a lower part of the stator core 11, including a lower base insulating part 131 for insulating a lower part of the base 111, a lower teeth insulating part 132 formed radially in the outer circumferential direction of the lower base insulating part 131, for insulating a lower part of the teeth part 112, and a lower teeth end insulating part 133 located under the teeth end 113, protruding downward at an end of the lower teeth insulating part 132; and a coil 14 wound around the teeth part 112, wherein a coil hook 123A on which the coil 14 is hooked is formed to protrude upward from an upper part of the upper teeth end insulating part 123.

According to the present invention, preferably, a lower part of the coil 14 hooked on the coil hook 123A is supported on a pair of coil support grooves 123B formed at both sides of the lower part of the coil hook 123A.

According to the present invention, preferably, a support protrusion 123A-1 protruding downward is formed at both ends of a portion extending from the upper part to both sides of the coil hook 123A.

According to the present invention, preferably, an outer coil guide 126 is formed to protrude upward in a boundary between the upper base insulating part 121 and the upper teeth insulating part 122.

According the present invention, preferably, an inner coil guide 125 of a circular shape protruding upward is formed in a boundary between an upper part of the upper base insulating part 121 and an upper coupling part 124, and the inner coil guide 125 is spaced away from the outer coil guide 126 at a certain interval.

Advantageous Effects of Invention

The preset invention has the effects of effectively guiding the coil at the teeth end and firmly winding the coil therearound at the same time, facilitating coil winding and having excellent workability, and preventing the defect in the stator.

BRIEF DESCRIPTION OF DRAWINGS

FIG. 1 is a perspective view illustrating a stator according to the present invention;

FIG. 2 is an exploded perspective view illustrating the stator according to the present invention;

FIG. 3 is a perspective view illustrating a portion of the stator where a coil is wound according to the present invention;

FIG. 4 is a plan view illustrating a portion of the stator where the coil is wound according to the present invention;

FIG. 5 is an enlarged perspective view illustrating a coil hook of the stator according to the present invention; and FIG. 6 is a cross-sectional view illustrating a portion of the stator where the coil is wound around the coil hook according to the present invention.

Hereinafter, the present invention will be explained in detail with reference to the accompanying drawings.

MODE FOR THE INVENTION

FIG. 1 is a perspective view illustrating a stator 1 according to the present invention, and FIG. 2 is an exploded perspective view illustrating the stator 1 according to the present invention. As illustrated in FIGS. 1 and 2, the stator 1 according to the present invention comprises a stator core 11, an upper insulator 12, a lower insulator 13, and a coil 14.

The stator core 11 includes a base 111 of a circular shape and a teeth part 112 formed radially from the base 111. The teeth part 112 includes a teeth end 113 which extends to both sides from the end thereof in the circumferential direction. The teeth part 112 is formed outward from the base 111 of a circular shape in FIGS. 1 and 2, but is not limited thereto. The teeth 112 may be formed inward from the base 111 of a circular shape. A space between two adjacent teeth parts 112 refers to a slot S.

The upper insulator 12 is coupled to the upper part of the stator core 11 to insulate the upper parts of the base 111 and the teeth part 112. An upper base insulating part 121 insulates the upper part of the base 111. An upper teeth insulating part 122 insulates the upper part of the teeth part 112 and is formed radially in the outer circumferential direction of the upper base insulating part 121, corresponding to the teeth part 112. An upper teeth end insulating part 123 is located over the teeth end 113 and protrudes upward at the end of the upper teeth insulating part 122.

A coil hook 123A is formed to protrude upward from the upper part of the upper teeth end insulating part 123. An upper coupling part 124 protruding inward is formed in the inner circumferential surface of the upper base insulating part 121, opposite to the teeth. An upper coupling hole 124A is formed in the upper coupling part 124. A terminal tab 124B for connecting an external power source with the coil 14 is formed at one side of the upper coupling part 124. An inner coil guide 125 of a circular shape protruding upward is formed in the boundary between the upper part of the upper base insulating part 121 and the upper coupling part 124. An outer coil guide 126 protruding upward is formed in the boundary between the upper base insulating part 121 and the upper teeth insulating part 123. There is a certain interval between the inner coil guide 125 and the outer coil guide 126, and the interval serves as a passage by which the coil passes.

The lower insulator 13 is coupled to the lower part of the stator core 11 to insulate the lower parts of the base 111 and the teeth part 112. A lower base insulating part 131 insulates the lower part of the base 111. A lower teeth insulating part 132 insulates the lower part of the teeth part 112 and is formed radially in the outer circumferential direction of the lower base insulating part 131, corresponding to the teeth part 112. A lower teeth end insulating part 133 is located under the teeth end 113 and protrudes downward at the end of the lower teeth insulating part 132. A lower coupling part 134 protruding inward is formed in the inner circumferential surface of the lower base insulating part 131, opposite to the teeth. A lower coupling hole 134A is positioned in the lower coupling part 134 to correspond to the upper coupling hole 124A. A bolt (not illustrated) penetrates into the upper coupling hole 124A and the lower coupling hole 134A to fix the stator 1 to the position where the motor is fixed.

A teeth side insulating part 132A is formed to protrude upward from the lower teeth insulating part 132 to insulate the inner side surface of the slot S. As such, when the upper insulator 12 and the lower insulator 13 are coupled to the stator core 11, the coil is wound while the upper part, lower part and side part of the teeth part 112 are all insulated. In another embodiment, the teeth side insulating part 132A may be formed to protrude downward from the upper teeth insulating part 122, not protruding upward from the lower teeth insulating part 132. In yet another embodiment, part of the teeth side insulating part 132A may be formed to protrude downward from the upper teeth insulating part 122 and the rest thereof may be formed to protrude upward from the lower teeth insulating part 132.

The coil 14 is wound around the teeth part 112 of the stator core 11 surrounded by the upper insulator 12 and the lower insulator 13. The details as to the winding of the coil 14 around the teeth part 112 are explained as below.

FIG. 3 is a perspective view illustrating a portion of the stator 1 where a coil 14 is wound according to the present invention, FIG. 4 is a plan view, and FIG. 5 is an enlarged perspective view illustrating a coil hook of the stator 1 according to the present invention.

Referring to FIGS. 3 to 5 together, the coil 14 wound around the stator 1 according to the present invention moves along the interval between the inner coil guide 125 and the outer coil guide 126 and is wound around the upper teeth insulating part 122 and the lower teeth insulating part 132 which surround the teeth part 112. The coil 14 is derived from the interval between the inner coil guide 125 and the outer coil guide 126 to a coil introduction groove 126A of the outer coil guide 126, is wound around the upper teeth insulating part 122 and the lower teeth insulating part 132 which surround the teeth part 112, and then passes through a coil deriving groove 126B of the outer coil guide 126 to move to the interval between the inner coil guide 125 and the outer coil guide 126. The coil in the interval between the inner coil guide 125 and the outer coil guide 126 moves to a next teeth part 112 to be wound.

The coil 14 which moves to the teeth part 112 from the coil introduction groove 126A is wound outward in the radial direction of the teeth part 112. The coil wound around the teeth part 112 according to the number of turns is hooked on the coil hook 123A at the teeth end 113 to turn its direction, and moves to the interval between the inner coil guide 125 and outer coil guide 126 through the coil deriving groove 126B. The present specification explains that the coil 14 is wound around the teeth part 112, which does not mean that the coil is directly wound on the surface of the teeth part 112, but means that the coil 14 is wound around the upper teeth insulating part 122, the lower teeth insulating part 132, and the teeth side insulating part 132A which surround the teeth part 112.

FIG. 6 is a cross-sectional view illustrating a portion of the stator 1 where the coil 14 is wound around the coil hook 123A according to the present invention. As illustrated in FIGS. 5 and 6, the coil hook 123A has a "T" shape when seen from the radial direction. A pair of coil support grooves 123B is formed under both sides of the coil hook 123A. The coil 14 changes its direction to have an "U" shape when seen from the top of the coil hook 123A, and the lower part of the coil 14 hooked on the coil hook 123A is supported on the coil support groove 123B. Therefore, as illustrated in FIG. 6(*a*), the coil 14 is press-fitted into the coil support groove 123B and the bottom of the portion extending from the upper part to both sides of the coil hook 123A, and thus is more firmly supported, thereby preventing the defect in coil winding caused by the change of the direction of the coil 14.

In order for the coil 14 to be more firmly supported by the coil hook 123A, as illustrated in FIG. 6(*b*), a support protrusion 123A-1 protruding downward may be formed at both ends of the portion extending from the upper part to both sides of the coil hook 123A. The support protrusion 123A-1 allows the coil 14 to be more effectively press-fitted into the coil support groove 123B and the bottom of the portion extending from the upper part to both sides of the coil hook 123A. Therefore, the present invention can prevent the defect that occurs during coil winding and facilitates the shaping operation, thereby improving workability and productivity.

It should be noted that the description of the present invention described above is merely an example for understanding the present invention, and is not intended to limit the scope of the present invention. The scope of protection of the present invention is defined by the accompanying claims, and it should be construed that simple modifications or alternations within the scope of the claims fall within the scope of the present invention.

The invention claimed is:

1. A stator comprising:
   a stator core (11) including a base (111) of a circular shape, a teeth part (112) formed radially from the base (111), and a teeth end (113) extending to both sides in the circumferential direction at an end of the teeth part (112);
   an upper insulator (12) coupled to an upper part of the stator core (11), including an upper base insulating part (121) for insulating an upper part of the base (111), an upper teeth insulating part (122) formed radially in the outer circumferential direction of the upper base insulating part (121), for insulating an upper part of the teeth part (121), and an upper teeth end insulating part (123) located over the teeth end (113), protruding upward at an end of the upper teeth insulating part (122);
   a lower insulator (13) coupled to a lower part of the stator core (11), including a lower base insulating part (131) for insulating a lower part of the base (111), a lower teeth insulating part (132) formed radially in the outer circumferential direction of the lower base insulating part (131), for insulating a lower part of the teeth part (112), and a lower teeth end insulating part (133) located under the teeth end (113), protruding downward at an end of the lower teeth insulating part (132); and
   a coil (14) wound around the teeth part (112),
   wherein a coil hook (123A) on which the coil (14) is hooked is formed to protrude upward from an upper part of the upper teeth end insulating part (123), and
   wherein a lower part of the coil (14) hooked on the coil hook (123A) is supported on a pair of coil support grooves (123B) formed at both sides of the lower part of the coil hook (123A).

2. The stator of claim 1, wherein a support protrusion (123A-1) protruding downward is formed at both ends of a portion extending from the upper part to both sides of the coil hook (123A).

3. A stator comprising:
   a stator core (11) including a base (111) of a circular shape, a teeth part (112) formed radially from the base (111), and a teeth end (113) extending to both sides in the circumferential direction at an end of the teeth part (112);
   an upper insulator (12) coupled to an upper part of the stator core (11), including an upper base insulating part (121) for insulating an upper part of the base (111), an upper teeth insulating part (122) formed radially in the outer circumferential direction of the upper base insulating part (121), for insulating an upper part of the teeth part (121), and an upper teeth end insulating part (123) located over the teeth end (113), protruding upward at an end of the upper teeth insulating part (122);
   a lower insulator (13) coupled to a lower part of the stator core (11), including a lower base insulating part (131) for insulating a lower part of the base (111), a lower teeth insulating part (132) formed radially in the outer circumferential direction of the lower base insulating part (131), for insulating a lower part of the teeth part (112), and a lower teeth end insulating part (133) located under the teeth end (113), protruding downward at an end of the lower teeth insulating part (132); and
   a coil (14) wound around the teeth part (112),
   wherein a coil hook (123A) on which the coil (14) is hooked is formed to protrude upward from an upper part of the upper teeth end insulating part (123), and
   wherein an outer coil guide (126) is formed to protrude upward in a boundary between the upper base insulating part (121) and the upper teeth insulating part (122).

4. The stator of claim 3, wherein an inner coil guide (125) of a circular shape protruding upward is formed in a boundary between an upper part of the upper base insulating part (121) and an upper coupling part (124), and the inner coil guide (125) is spaced away from the outer coil guide (126) at a certain interval.

\* \* \* \* \*